(12) United States Patent
Chou

(10) Patent No.: US 12,710,084 B2
(45) Date of Patent: Aug. 18, 2026

(54) DEVICE FOR CONTROLLING FLUID FLOW IN A SHOCK ASSEMBLY

(71) Applicant: Fox Factory, Inc., Duluth, GA (US)

(72) Inventor: Yi-Hong Chou, Taichung (TW)

(73) Assignee: Fox Factory, Inc., Duluth, GA (US)

( * ) Notice: Subject to any disclaimer, the term of this patent is extended or adjusted under 35 U.S.C. 154(b) by 457 days.

(21) Appl. No.: 18/243,047

(22) Filed: Sep. 6, 2023

(65) Prior Publication Data

US 2024/0084871 A1 Mar. 14, 2024

Related U.S. Application Data

(60) Provisional application No. 63/404,870, filed on Sep. 8, 2022.

(51) Int. Cl.

| | |
|---|---|
| ***F16F 9/50*** | (2006.01) |
| ***F16F 9/34*** | (2006.01) |
| ***F16F 9/348*** | (2006.01) |
| ***F16F 9/56*** | (2006.01) |
| *F16F 9/342* | (2006.01) |
| *F16F 9/46* | (2006.01) |

(52) U.S. Cl.

CPC .............. *F16F 9/50* (2013.01); *F16F 9/3485* (2013.01); *F16F 9/3488* (2013.01); *F16F 9/56* (2013.01); *F16F 9/342* (2013.01); *F16F 9/466* (2013.01); *F16F 2222/12* (2013.01); *F16F 2228/08* (2013.01); *F16F 2230/42* (2013.01)

(58) Field of Classification Search

CPC ........ F16F 9/342; F16F 9/3485; F16F 9/3488; F16F 9/50; F16F 9/56; F16F 9/466; F16F 2222/12; F16F 2228/08; F16F 2230/42

USPC .................................................... 188/322.14

See application file for complete search history.

(56) References Cited

U.S. PATENT DOCUMENTS

| | | | | |
|---|---|---|---|---|
| 2,869,685 A * | 1/1959 | Funkhouser ............ | F16F 9/504 188/315 |
| 3,256,960 A | 6/1966 | Casimir | |
| 5,078,241 A | 1/1992 | Ackermann et al. | |
| 5,176,229 A | 1/1993 | Kanari et al. | |
| 5,579,814 A | 12/1996 | Jones et al. | |

(Continued)

FOREIGN PATENT DOCUMENTS

| | | |
|---|---|---|
| DE | 1270426 B | 6/1968 |
| EP | 1188950 A2 | 3/2002 |

(Continued)

OTHER PUBLICATIONS

European Examination Report for European Application No. 16176260.4, 7 pages, May 14, 2018.

(Continued)

*Primary Examiner* — Thomas J Williams

(57) ABSTRACT

A device for controlling fluid flow in a shock assembly is disclosed. The device includes a single adjustable fluid circuit configured for controlling a damping force associated with multiple compression forces. The single adjustable fluid circuit comprises a fluid passageway through a base valve and a positionally adjustable piston assembly with a floating shim stack positioned at one end of the fluid passageway, the positionally adjustable piston assembly with the floating shim stack configured for selectively blocking a flow of fluid through the fluid passageway.

8 Claims, 13 Drawing Sheets

(56) References Cited

U.S. PATENT DOCUMENTS

| | | | | |
|---|---|---|---|---|
| 6,158,559 | A | 12/2000 | Asa et al. | |
| 6,360,857 | B1 | 3/2002 | Fox et al. | |
| 6,505,719 | B2 | 1/2003 | Gonzalez et al. | |
| 6,655,510 | B2 | 12/2003 | Kamioka | |
| 7,163,223 | B2 | 1/2007 | Wesling et al. | |
| 7,810,826 | B2 | 10/2010 | McAndrews et al. | |
| 8,256,787 | B2 | 9/2012 | Inoue et al. | |
| 8,838,335 | B2 | 9/2014 | Bass et al. | |
| 9,353,818 | B2 | 5/2016 | Marking | |
| 9,682,604 | B2 | 6/2017 | Cox et al. | |
| 9,797,467 | B2 | 10/2017 | Wootten et al. | |
| 10,036,443 | B2 | 7/2018 | Galasso et al. | |
| 10,363,987 | B2 | 7/2019 | Gilbert et al. | |
| 10,415,662 | B2 | 9/2019 | Marking | |
| 11,066,123 | B2 | 7/2021 | Gilbert et al. | |
| 11,731,728 | B2 | 8/2023 | Gilbert et al. | |
| 2001/0040078 | A1 | 11/2001 | Gonzalez et al. | |
| 2002/0096408 | A1 | 7/2002 | Moradmand et al. | |
| 2006/0011433 | A1 | 1/2006 | Carlstedt et al. | |
| 2006/0231361 | A1 | 10/2006 | Kojima | |
| 2007/0068752 | A1* | 3/2007 | Chen | B62K 25/08 188/316 |
| 2007/0074939 | A1* | 4/2007 | Chen | F16F 9/56 188/297 |
| 2009/0065316 | A1* | 3/2009 | Chen | B62K 25/08 188/322.14 |
| 2010/0044975 | A1 | 2/2010 | Yablon et al. | |
| 2014/0124313 | A1 | 5/2014 | Ericksen et al. | |
| 2014/0291088 | A1 | 10/2014 | Katayama et al. | |
| 2015/0284048 | A1 | 10/2015 | Barefoot | |
| 2016/0017953 | A1 | 1/2016 | Lee | |
| 2016/0375951 | A1 | 12/2016 | Gilbert et al. | |
| 2024/0084871 | A1* | 3/2024 | Chou | F16F 9/19 |

FOREIGN PATENT DOCUMENTS

| | | | |
|---|---|---|---|
| EP | 1826453 | B1 | 8/2009 |
| EP | 3109502 | A2 | 12/2016 |
| WO | 2006065235 | A2 | 6/2006 |

OTHER PUBLICATIONS

EP Search Report for European Application No. 16176260.4, Mar. 13, 2017, 8 Pages.

European Extended Search Report for European Application No. 23196400.8, 10 Pages, Mailed Mar. 20, 2024.

European Search Report for European Application No. 23178126.1, 7 Pages, Mailed Nov. 3, 2023.

Taiwanese Office Action for TW Application No. 112134311, 13 Pages, Mailed Dec. 5, 2024.

* cited by examiner

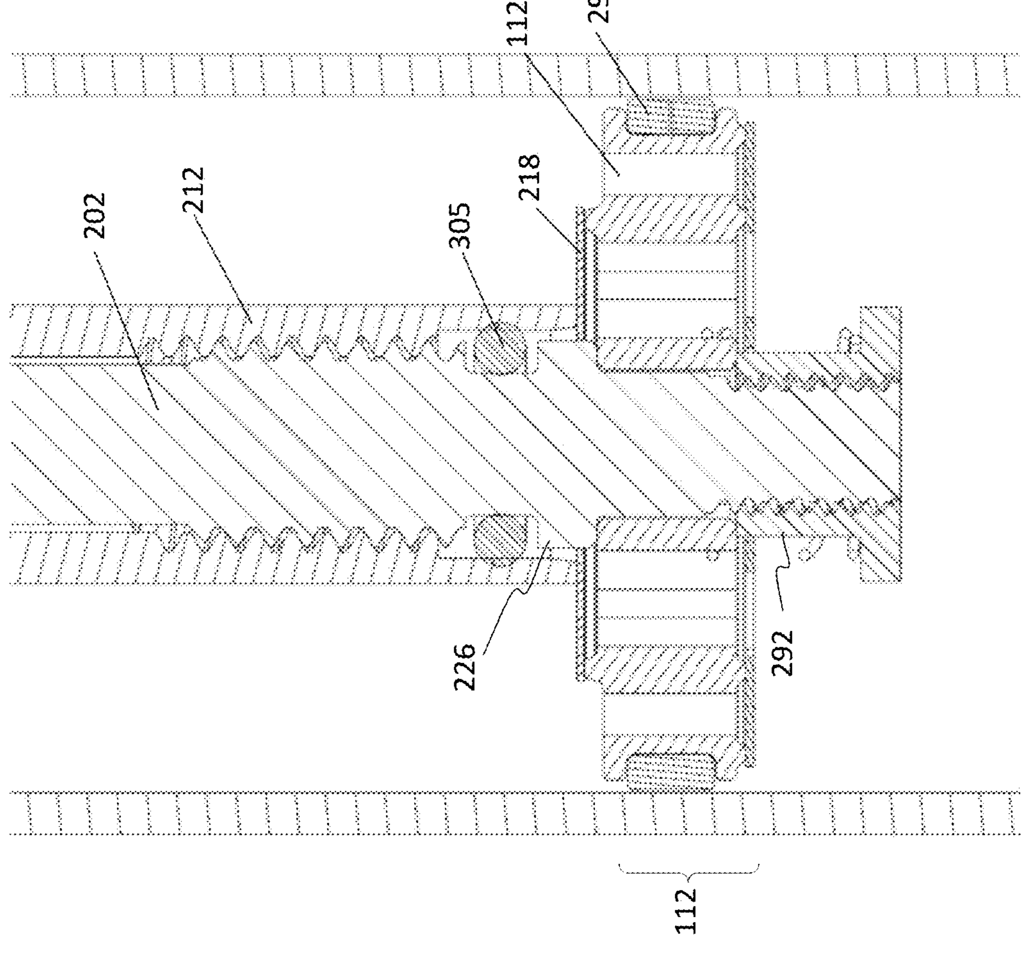
293
112
218
212
202
305
226
292
112
FIG. 2B
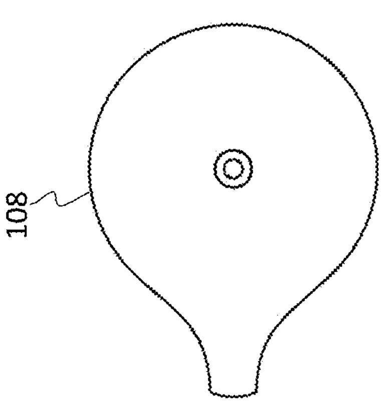
108

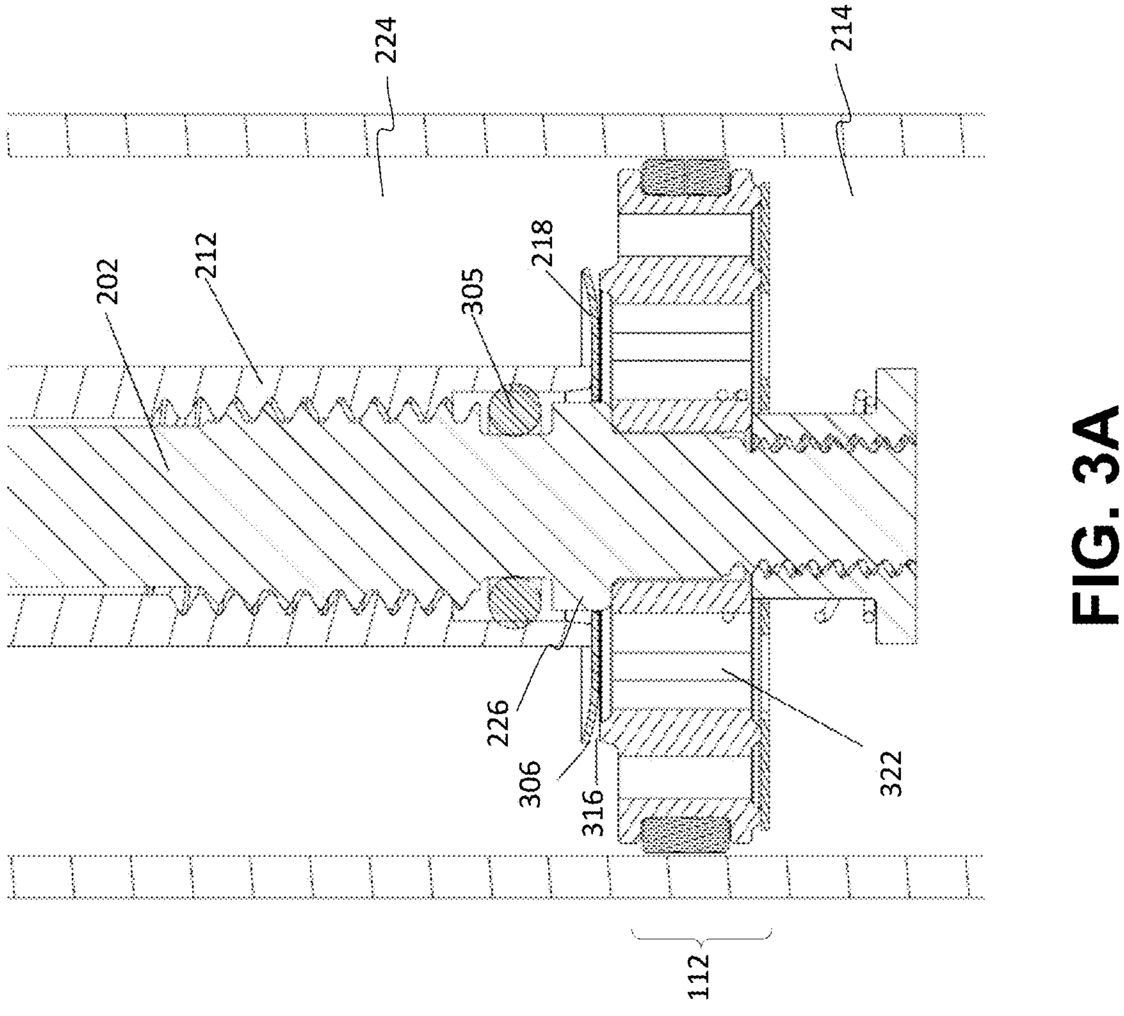
FIG. 3A
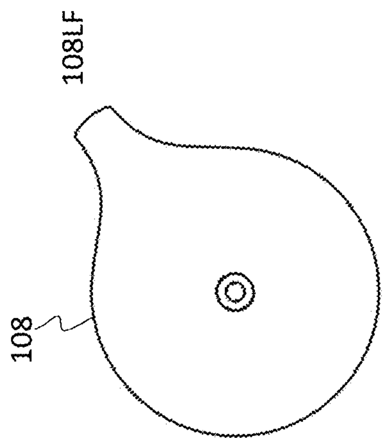

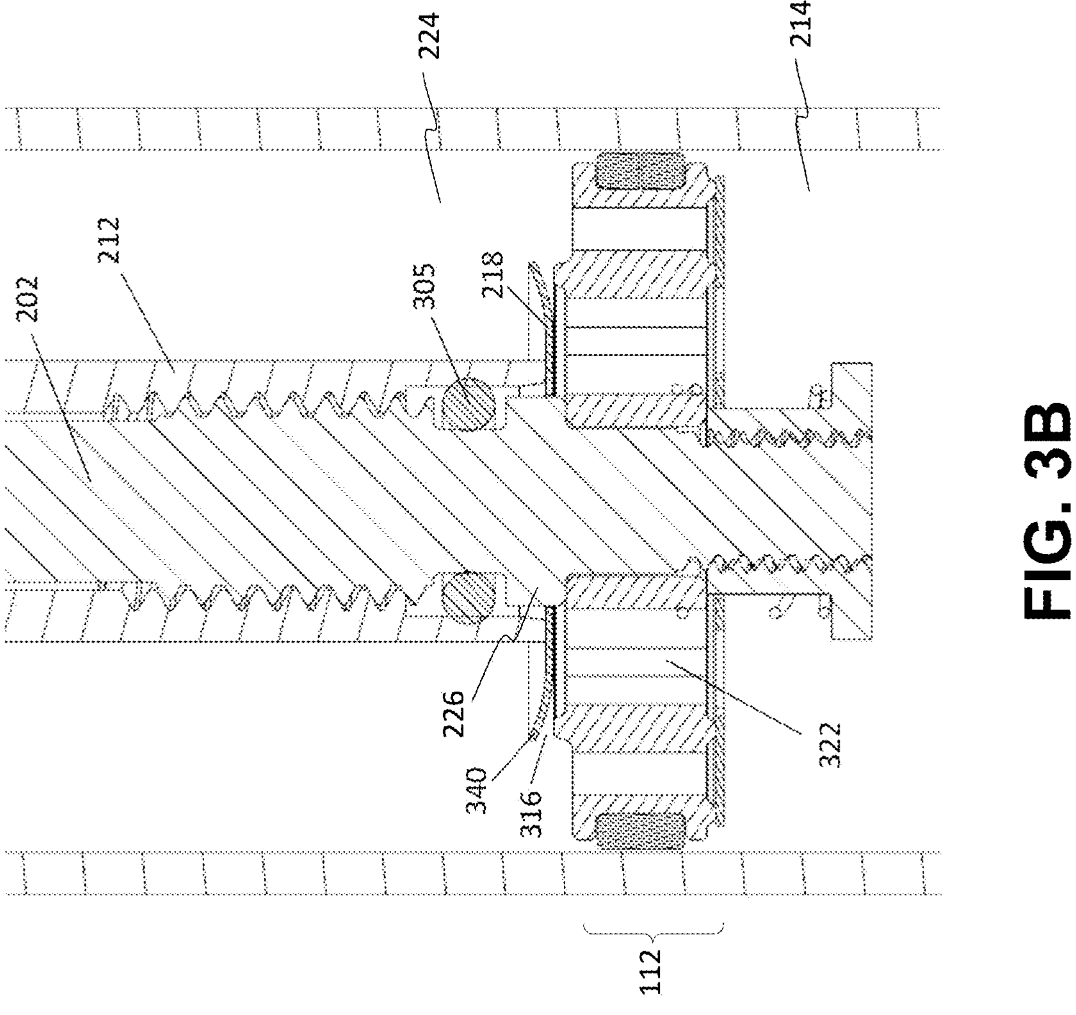
FIG. 3B
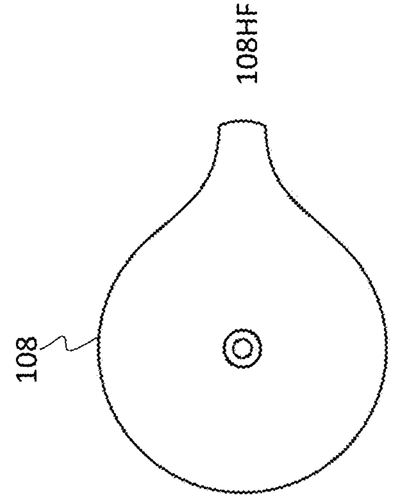

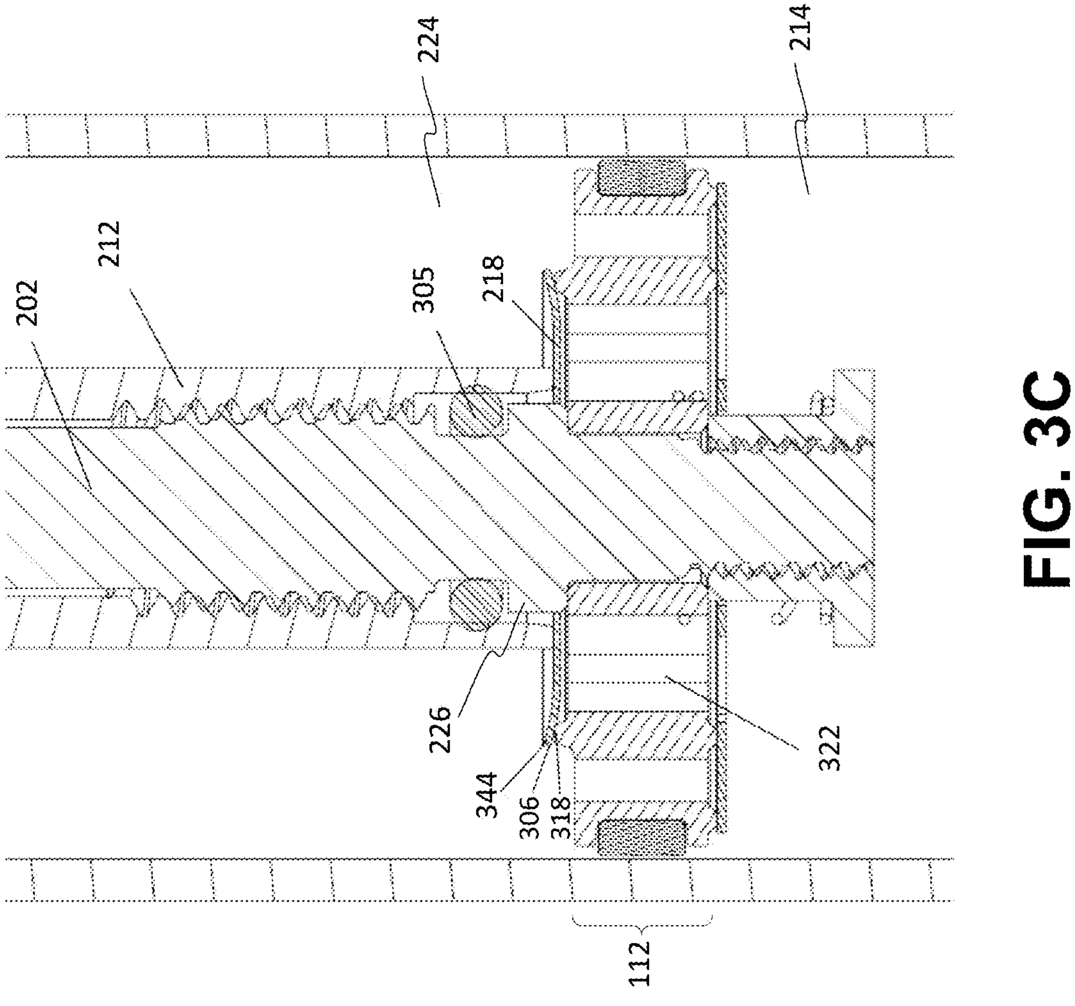
FIG. 3C
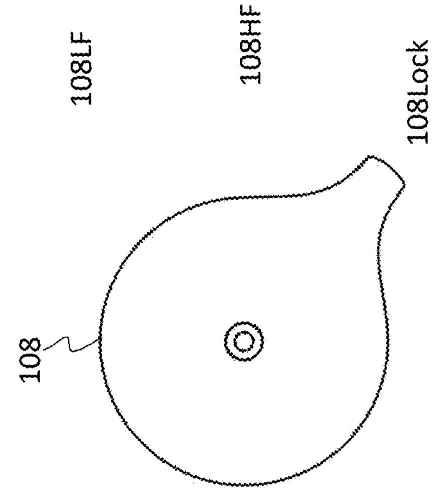

DEVICE FOR CONTROLLING FLUID FLOW IN A SHOCK ASSEMBLY

CROSS-REFERENCE TO RELATED APPLICATIONS (PROVISIONAL)

This application claims priority to and benefit of U.S. Provisional Patent Application No. 63/404,870 filed on Sep. 8, 2022, entitled "DEVICE FOR CONTROLLING FLUID FLOW IN A SHOCK ASSEMBLY" by Yi-Hong Chou, and assigned to the assignee of the present application, the disclosure of which is hereby incorporated by reference in its entirety.

INCORPORATION BY REFERENCE

This application incorporates by reference U.S. patent application Ser. No. 17/373,578, filed on Jul. 12, 2021, now U.S. Issued U.S. Pat. No. 11,731,728, entitled "COMPRESSION PISTON" by Damon Gilbert et al., assigned to the assignee of the present application, and is hereby incorporated by reference herein in their entireties.

This application incorporates by reference U.S. patent application Ser. No. 16/522,433, filed on Jul. 25, 2019, now U.S. Issued U.S. Pat. No. 11,066,123, entitled "COMPRESSION PISTON" by Damon Gilbert et al., assigned to the assignee of the present application, and is hereby incorporated by reference herein in their entireties.

This application incorporates by reference U.S. patent application Ser. No. 15/192,842, filed on Jun. 24, 2016, now U.S. Issued U.S. Pat. No. 10,363,987, entitled "COMPRESSION PISTON" by Damon Gilbert et al., assigned to the assignee of the present application, and is hereby incorporated by reference herein in their entireties.

FIELD OF THE INVENTION

Embodiments of the invention generally relate to a damper assembly for a vehicle. More specifically, the invention relates to a hydraulic circuit for use with a vehicle suspension.

BACKGROUND

Shock absorbers (e.g., dampers) are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more dampers, the impact force can be significantly reduced or even absorbed completely before it is transmitted to a person on a seat of the vehicle.

BRIEF DESCRIPTION OF THE DRAWINGS

Aspects of the present invention are illustrated by way of example, and not by way of limitation, in the accompanying drawings, wherein:

FIG. 2B depicts an enlarged cross-sectional view of a portion of the compression damper of FIG. 2A, in accordance with an embodiment.

FIG. 3A depicts an enlarged cross-sectional view of a portion of the compression damper of FIG. 2A with the knob positioned in a low compression force setting, in accordance with an embodiment.

FIG. 3B depicts an enlarged cross-sectional view of a portion of the compression damper of FIG. 2A with the knob positioned in a high compression force setting, in accordance with an embodiment.

FIG. 3C depicts an enlarged cross-sectional view of a portion of the compression damper of FIG. 2A with the knob positioned in a lockout position, in accordance with an embodiment.

Figure 1:
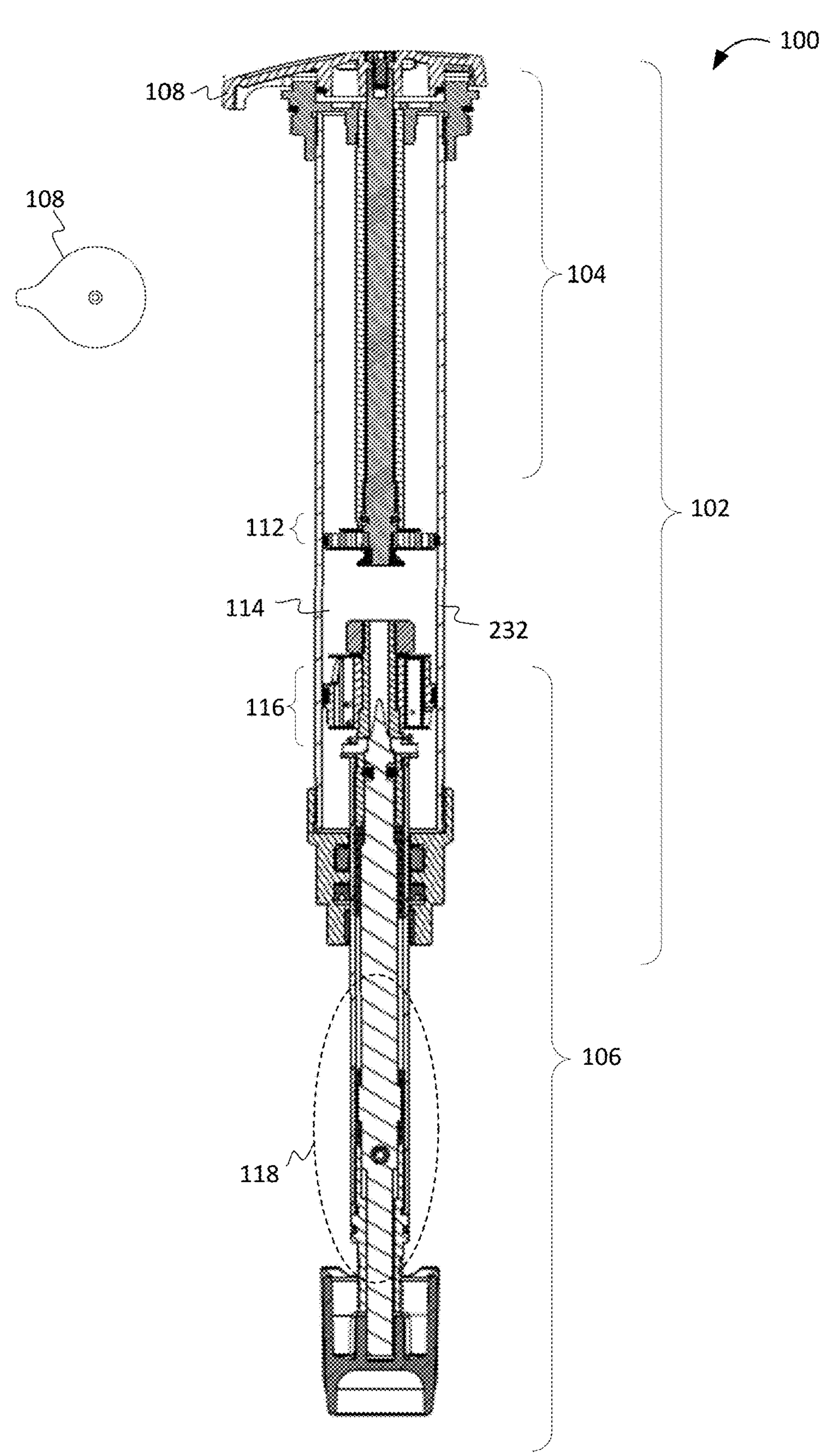
FIG. 1 depicts a cross-sectional view of a shock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

Embodiments describe a novel compression piston disposed within a shock absorber, wherein the compression piston has a single adjustable circuit there through that, via a single control feature and a floating shim stack that may be variably pre-loaded, controls damping for low compression force setting (e.g., softer damping force setting) through high compression force setting (e.g., stiffer damping force setting) and up to lockout of the compression of the damper within the shock absorber.

With respect to the term "lockout", for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, lockout could refer to a lockout state or a "perceived lockout"; that is, the flow area through a flow path of the damper has been reduced to a minimum size for a given damper, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

Embodiments described herein further provide modifications to an adjustable fluid circuit. In one embodiment, modifications to the adjustable floating shim stack are used to control the flow of fluid without the requirement of an internal floating piston (IFP). In one embodiment, the removal of the requirement for an IFP provides a cost saving and parts reduction for the resulting monotube damper 100. In one embodiment, the embodiments disclosed herein may be used in conjunction with an IFP.

Embodiments described herein may allow a user to apply less torque/force to the control feature used for adjusting/achieving different compression settings including the lock-out mode.

Embodiments described herein allow the position of the piston to be adjustable relative to the shaft.

Embodiments described herein include a positionally adjustable piston that is coupled with a needle and configured to move a certain distance towards the shaft when compression forces act on the damper. This allows for generating larger damping forces.

Embodiments described herein allow the positionally adjustable piston to apply an additional preload force to the shims when the piston is in contact with the shims, this may allow the user to apply less torque/force to the control feature used for adjusting and/or locking out the damper.

Embodiments described herein include a reduced number of seals (e.g., O-rings, etc.) in the assembly which may add to the benefit of allowing the user to apply less force to the control feature used to adjust the compression settings of the damper.

With reference now to FIG. 1, a cross-sectional view of a damper of a shock assembly is shown in accordance with an embodiment. In one embodiment, the damper is a monotube damper 100. Although a monotube damper is shown as the shock assembly damper, it should be appreciated that the embodiments disclosed herein could be used in other shock assembly, suspension, and/or component damper types such as those disclosed in U.S. Pat. Nos. 8,838,335; 9,353,818; 9,682,604; 9,797,467; 10,036,443; 10,415,662; the content of which are incorporated by reference herein, in their entirety.

In one embodiment, the monotube damper 100 is configured for being disposed within a suspension fork. The monotube damper 100 includes a rod 106 telescopically disposed within the cartridge 102. The cartridge 102 is shown to include a fluid filled chamber 114, a compression damper 104 that is coupled with a control feature 108 and a main piston 116 that is coupled with the rod 106. The portion of the rod 106 that is exposed to an oil bath within the shock absorber is indicated as element 118. In one embodiment, the compression damper 104 includes a compression piston 112 (also called a base valve).

In one embodiment, control feature 108 is a knob that is coupled with the monotube damper 100 and is manually adjustable/rotatable to adjust the compression settings. In one embodiment, control feature 108 is a switch (or lever) located remote from the monotube damper 100 and has a wired connection with a rotating feature on the monotube damper 100 such that a user input to the control feature 108 will adjust the compression settings of the monotube damper 100. In one embodiment, control feature 108 is a switch (or lever, computing component, controller, or the like) located remote from the monotube damper 100 and has a wireless connection with a rotating feature on the monotube damper 100 such that a user input to the control feature 108 will adjust the compression settings of the monotube damper 100.

Figure 2A:
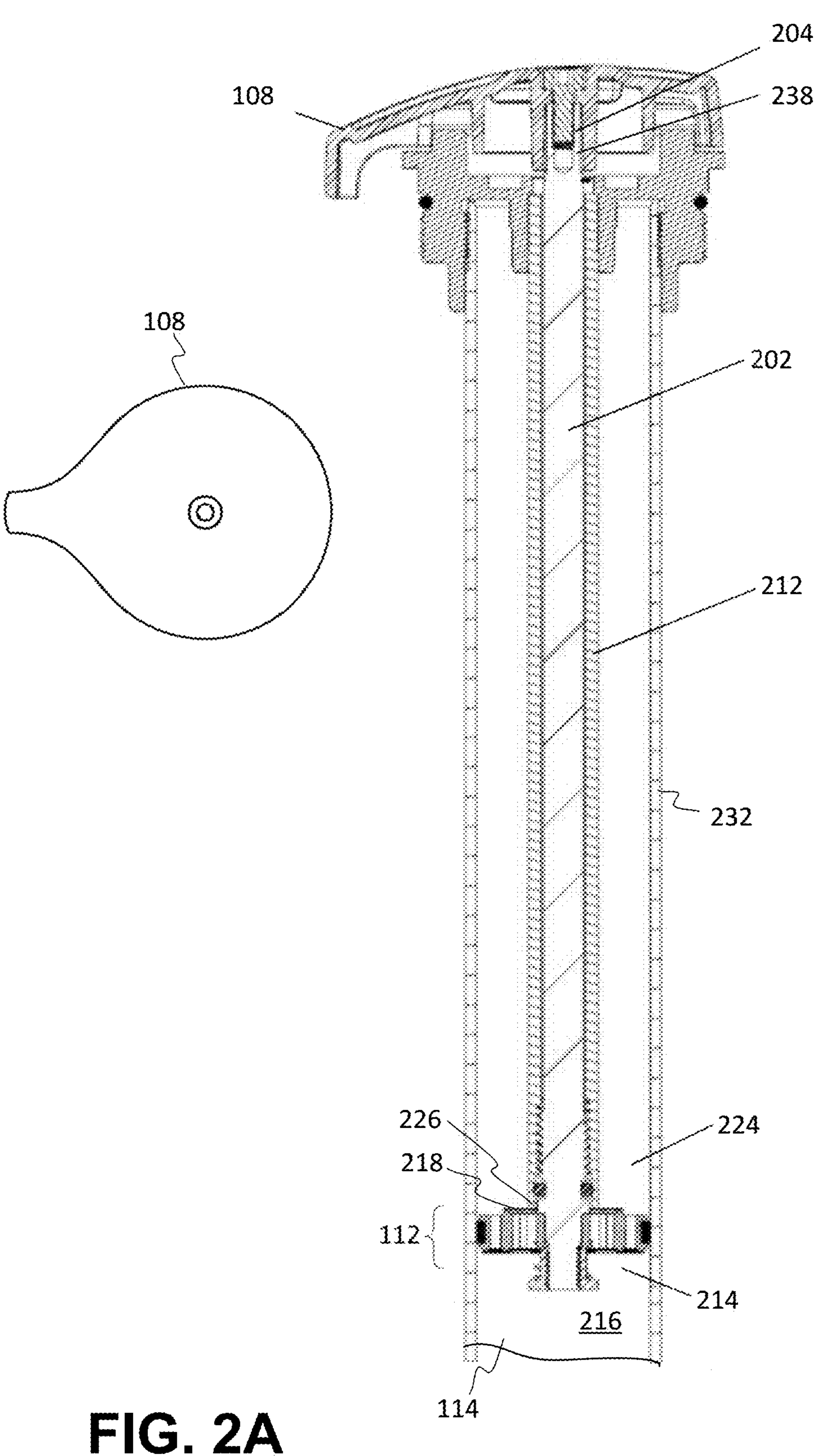
FIG. 2A depicts an enlarged cross-sectional view of the compression damper of FIG. 1, in accordance with an embodiment.

With reference now to FIG. 2A, an enlarged cross-sectional view of the compression damper 104 of FIG. 1 is shown in accordance with an embodiment. In one embodiment, the compression damper 104 includes a control feature 108, a shaft 212 and a needle 202. In one embodiment, shaft 212 surrounds the needle 202. In one embodiment, needle 202 has a tip 238 on the upper end thereof (e.g., closest to control feature 108). In one embodiment, tip 238 has a tapped hole with a retaining feature such as shaft threads 204 disposed thereon to couple the needle 202 with the control feature 108. As will be explained in more detail below, in one embodiment, the compression damper 104 also includes a shim stack 218 of predetermined stiffness, and the compression piston 112. In one embodiment, tip 238 is a hex shaped tip. In another embodiment, tip 238 is shape (such as a star, pentagon, square, or other shape) of a portion of needle 202 which allows the control feature 108 to be rotationally coupled with needle 202. For example, such that the rotation of control feature 108 causes a rotation of needle 202.

In one embodiment, the compression piston 112 is disposed within the fluid filled chamber 114 and is used to define a first side 214 and a second side 224 of fluid filled chamber 114. In one embodiment, the fluid 216 is oil.

FIGS. 3A-3C depict, in one embodiment, enlarged cross-sectional views of a portion of the compression damper 104, and more specifically, the compression piston 112 and surrounding areas, in accordance with embodiments. Further, FIGS. 3A-3C depict positions of the shim stack 218 at varying compression forces (or damping forces) ranging from a low compression force setting (e.g., FIG. 3A), to higher compression force setting (e.g., FIG. 3B) and all the way to lockout (e.g., FIG. 3C).

FIGS. 3A-3C also show a shim stack 218 effectively "floats" and is not clamped (pinched) into a particular position. This "float" is maintained during operation, regardless of whether the shim stack 218 is positioned in the low compression force setting, a higher compression force setting or lockout.

Referring now to FIG. 2B, an enlarged cross-sectional view of a portion of the compression damper 104 of FIG. 2A is shown in accordance with an embodiment. The components of FIG. 2B which may be shown in more detail than that of FIG. 2A are also described herein in conjunction with FIG. 2C-2F.

In one embodiment, the second end on the needle 202 is a flange 226 (or the like) on the needle 202 which is designed to clamp the piston 112 with hex nut 292. In one embodiment, the piston 112 is clamped between needle 202 and a hex nut 292. In one embodiment, the hex nut 292 is threaded on the needle 202. In one embodiment, a spring 291 is located between hex nut 292 and piston 112. In one embodiment, piston 112 is fixedly coupled with needle 202, so when the needle 202 move downward, it brings the piston 112 down together. In one embodiment, the interface between the piston 112 and needle 202 is designed to be a hexagon shape (e.g., hex nut 292) such that the piston 112 will rotate together with the needle 202 and control feature 108 at the same time. However, in another embodiment, the interface between the piston 112 and needle 202 may be of another geometric design (e.g., star, oval, square, octagon, etc.) that will also cause piston 112 to rotate together with the needle 202 and control feature 108 at the same time.

Figure 2D:
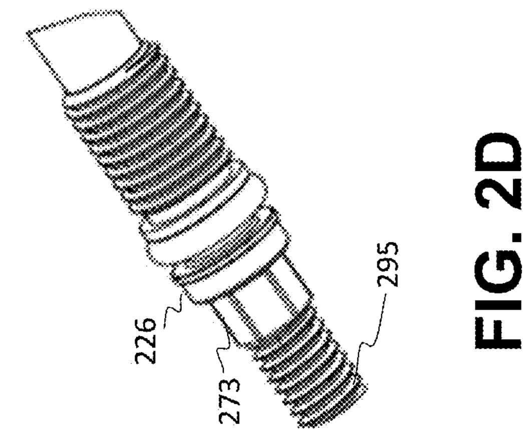
FIG. 2D depicts a perspective view of a portion of FIG. 2B, in accordance with an embodiment.
Figure 2C:
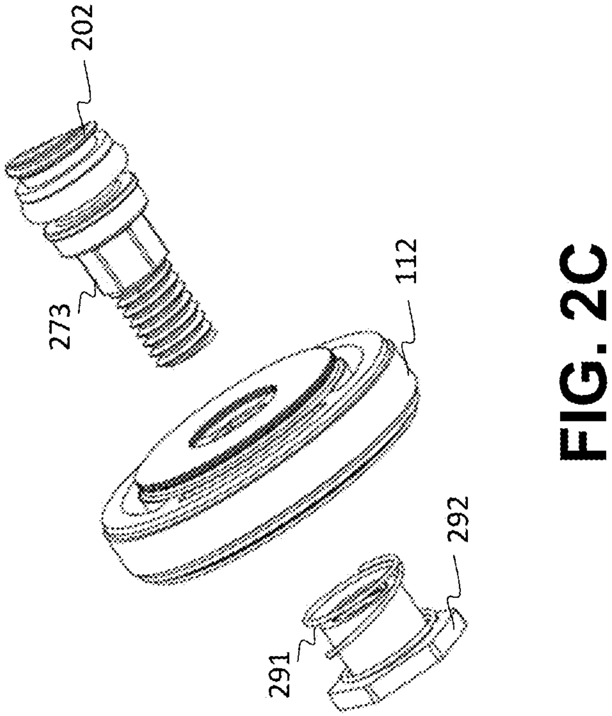
FIG. 2C depicts an exploded view of a portion of FIG. 2B, in accordance with an embodiment.

FIG. 2C depicts an exploded view of a portion of FIG. 2B shown in accordance with an embodiment. In FIG. 2C, a threaded end of needle 202 with a geometric shaped section 273 will pass through piston 112 and hex nut 292 is used to capture piston 112 when hex nut 292 is coupled with the threads of needle 202 are shown in accordance with one embodiment. Although a threaded section and a hex nut 292 are shown, it should be appreciated that the fastener could be another type such as a pressed fitting, or the like.

FIG. 2D depicts a perspective view of a portion of FIG. 2B, in accordance with an embodiment. In one embodiment, FIG. 2D illustrates the threads 295, geometric shaped section 273, and flange 226 portion of needle 202. In one embodiment, the hole through piston 112, through which needle 202 passes, has a similar geometric shape as geometric shaped section 273 shown in FIGS. 2C and 2D. In so doing, when the piston 112 and needle 202 are assembled, a rotation of needle 202 will cause a rotation of piston 112.

Figure 2F:
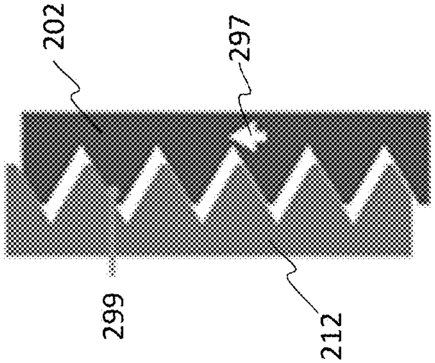
FIG. 2F depicts a perspective view of a portion of the needle and shaft of FIG. 2B in a lockout status with compression on the damper, in accordance with an embodiment.
Figure 2E:
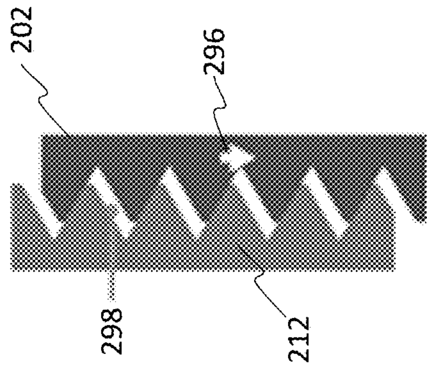
FIG. 2E depicts a perspective view of a portion of the needle and shaft of FIG. 2B in a lockout status with no compression on the damper, in accordance with an embodiment.

FIG. 2E depicts a perspective view of a portion of the needle 202 and shaft 212 of FIG. 2B in a lockout status with no compression on the damper, in accordance with an embodiment. In one embodiment, when there is no compression on the damper, the needle 202 is pulled down (e.g., in direction indicated by arrow 296) by the reaction force of shim elastic deformation. In one embodiment, when there is no compression on the damper, there can be a gap 298 between the teeth of the needle 202 and shaft 212.

FIG. 2F depicts a perspective view of a portion of the needle and shaft of FIG. 2B in a lockout status with compression on the damper, in accordance with an embodiment. In one embodiment, when there is compression on the damper, the needle 202 is pushed up (e.g., in direction indicated by arrow 297) which will cause the gap between the teeth of the needle 202 and shaft 212 to be covered.

Prior to the present embodiments, when compressing the damper, damper oil apply force on both piston and shims, pushing them upward. In contrast, in the embodiments disclosed herein, the piston 112 would move up slightly to cover 299 the small gap 298 between the thread of the needle 202 and the shaft 212. Because of this movement, embodiments described herein apply more preload to the shims and generate a larger damping force. As such, setting the compression force to a certain amount using embodiments described herein may require less torque be applied to the control feature 108. In other words, because of the closing of gap 298, the lockout force would increase and be greater than what is expected for a given lockout torque applied to control feature 108.

In one embodiment, a seal 305 (such as an O-ring, or the like) is used to keep fluid 216 from flowing into the area between needle 202 and shaft 212. In one embodiment, the end of the shaft 212 is in contact and pushing against the shim stack 218.

In general, shim stack 218 has an outer edge and an inner edge. The side of the piston 112 disposed nearest the shim stack 218 is identified by a piston face 318 of the compression piston 112 (identified in FIG. 3C). In one embodiment, a fluid passageway 322 (shown in FIGS. 3A-3C) is disposed through the compression piston 112. In one embodiment, shim stack 218 enables fluid to flow from the first side 214 of the compression piston 112 to the second side 224 of the compression piston 112 through the fluid passageway 322, but blocks the flow of fluid 216 through the fluid passageway 322 from the second side 224 to the first side 214.

In one embodiment, the pre-load force applied by shaft 212 to the shim stack 218 is dependent on the position of piston 112, which is controlled by the knob's 108 turn angle. Under this condition, in response to and during a compression event (as shown in the different FIGS. 3A-3C), fluid 216 pressure is applied to the shim stack 218, and the shim stack 218 flexes upwards under different fluid(oil) pressure based on the preload force that the shim stack 218 is experiencing. In one embodiment, a glide band 293 is around the piston 112 to provide sealing and to allow the piston 112 to rotate as control feature 108 is adjusted. For example, in one embodiment, when the control feature 108 is manually rotated only 2 seals need to be used. Moreover, when control feature 108 is a remote lever, only 1 seal is necessary, which may allow less force to adjust the damper.

With reference now to FIG. 3A, an enlarged cross-sectional view of a portion of the compression damper 104 of FIG. 2A with the control feature 108 positioned in a low compression force setting 108LF is shown in accordance with an embodiment. In one embodiment, control feature 108 is set at a low compression force setting 108LF where the piston 112 is hold at a position where the gap between piston 112 and shaft 212 is larger than the thickness of shim stack 218 which allow the shim stack 218 to move freely between piston 112 and shaft 212, but the shaft 212 is not pushing against the shim stack 218 so that the shim stack 218 may be lying on the piston face 318 (FIG. 3C). In this position, in response to and during a compression event, fluid 216 pressure is applied to the shim stack 218, and the second end 306 of the shim stack 218 flexes upwards and, in one embodiment, pushes the shim stack 218 against the shaft 212, creating a gap 316 to allow fluid 216 to go through. The fluid 216 will then flow through the fluid passageway 322 and through the gap 316, traveling from the first side 214 of the compression piston 112 to the second side 224 of the compression piston 112.

Referring now to FIG. 3B, an enlarged cross-sectional view of a portion of the compression damper of FIG. 2A with the control feature 108 positioned in a high compression force setting 108HF (e.g., a higher damping force setting) is shown in accordance with an embodiment. In one embodiment, high compression force setting 108HF depicts a setting providing more damping force support than the low damping force setting shown in FIG. 3A.

In one embodiment, when in a high compression force setting 108HF, the shim stack 218 flexes as shown by element 340. In one embodiment, by setting the control feature 108 to high compression force setting 108HF, the piston 112 moves up a certain distance and causes the shaft 212 to push against the shim stack 218 so that the shim stack 218 moves a certain distance ("distance one") that is greater than zero toward and/or into the fluid passageway 322.

In one embodiment, while the control feature 108 is in this position, in response to and during the compression event, fluid pressure is applied to the shim stack 218, and the shim stack 218 (having a predetermined stiffness) flexes upwards as shown by element 340. For purposes of clarity, the flexing "upward" refers to a flex in the direction of the control feature 108. In one embodiment, the shim stack 218, while flexed, will have a slightly concave shape ("concavity shape one"). The fluid 216 will then flow through the fluid passageway 322 and then through the gap 316, traveling from the first side 214 of the compression piston 112 to the second side 224 of the compression piston 112.

With reference now to FIG. 3C, an enlarged cross-sectional view of a portion of the compression damper 104 of FIG. 2A with the control feature 108 positioned in a lockout position (e.g., 108Lock) is shown in accordance with an embodiment. In one embodiment, when the control feature 108 is moved into the lockout position (e.g., 108Lock), the shim stack 218 in a third position (e.g., different than the positions of FIGS. 3A and 3B).

In one embodiment, lockout position (e.g., 108Lock) is a larger damping force setting than the other two position. In one embodiment, to achieve the lockout compression force setting (e.g., 108Lock) of the shim stack 218, the control feature 108 is rotated to be positioned at its greatest possible rotation. Thus, if the knob is rotatable to 220 degrees, then the control feature 108 is turned to the rotation position of 220 degrees. This achieves the lockout compression force setting (e.g., 108Lock) for the shim stack 218.

In one embodiment, the control feature 108 is set at a position such that the piston 112 is moved up to the highest position which caused the shaft 212 to be in contact with and pushing against shim stack 218 so that shim stack 218 moves a certain distance ("distance two") greater than "distance one" toward and/or into the fluid passageway 322. In one embodiment, the "distance two" is the maximum distance that the shim stack 218 can be moved into the fluid passageway 322. In this position, in response to and during the compression event, fluid 216 pressure is applied to the shim stack 218, and the shim stack 218 (with a predetermined stiffness) does not respond to this fluid 216 pressure when the fluid 216 pressure is lower than the predetermined lockout pressure. In this case, the compression damper provides the stiffest damping force. Once the fluid 216 pressure exceed the predetermined lockout pressure, the shim stack 218 would flex, the fluid 216 will then flow through the fluid passageway 322 and through the gap 316 releasing the fluid 216 pressure thereby preventing damage to the cartridge 102.

In one embodiment, as described herein, the control feature 108 may be turned upwards of approximately 220 degrees from its original position. However, it should be appreciated that in other embodiments, the control feature 108 may be rotated more or less than 220 degrees. It should be noted that in one embodiment, the control feature 108 is continuously adjustable. Further, in one embodiment, the control feature 108 has one or more detents that correspond with different compression force(s).

Moreover, it should be appreciated that the shim stack 218 may move greater or less distances than that of "distance one" and "distance two" and may be caused to have a greater or lesser concave shape than "concavity shape one".

Figure 4:
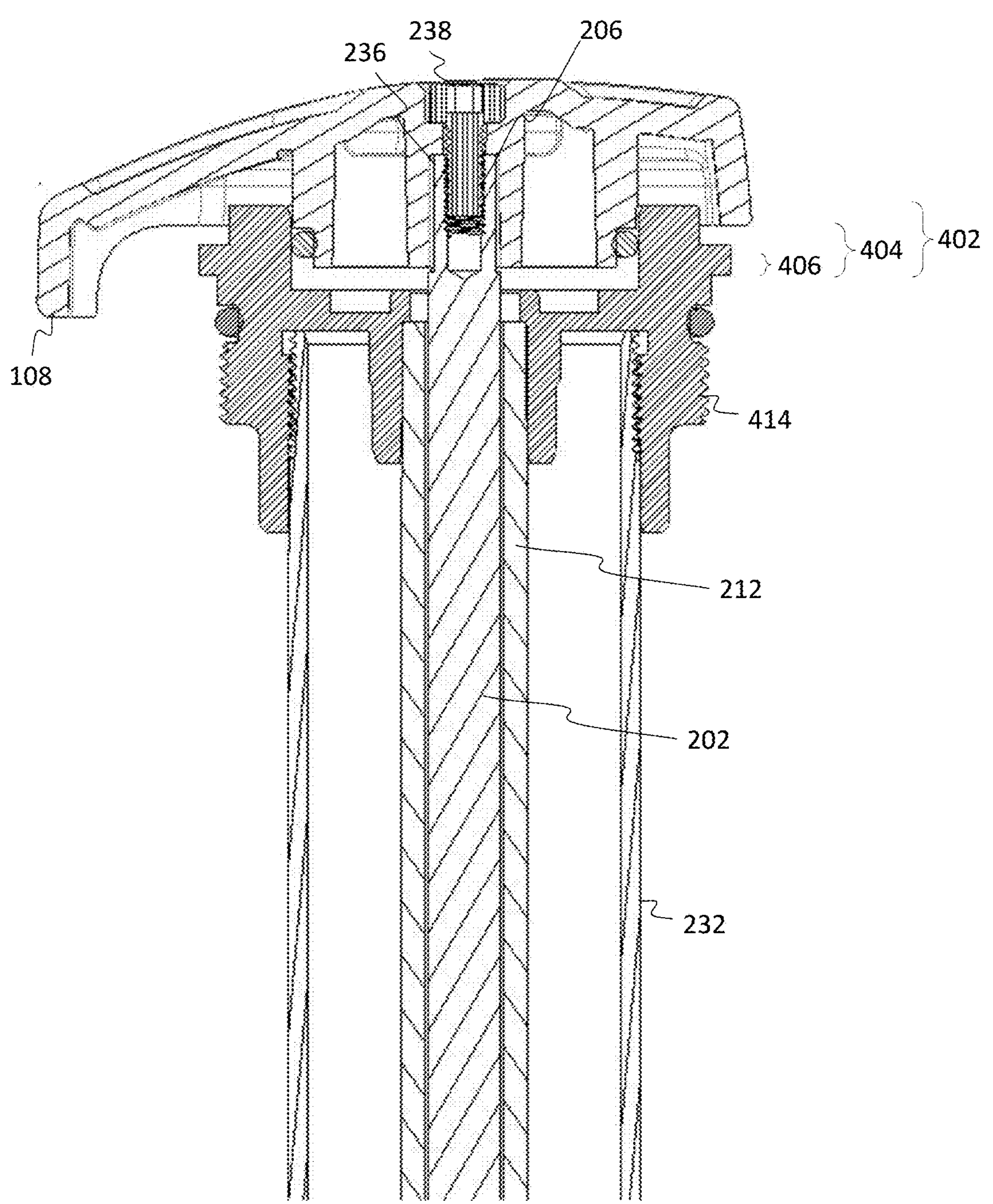
FIG. 4 depicts an enlarged cross-sectional view of a portion of the compression damper and knob shown in FIG. 1, in accordance with an embodiment.

With reference now to FIG. 4, an enlarged cross-sectional view a portion of the compression damper 104, and more particularly, the control feature 108 and the first end 236 of the needle 202 is shown in accordance with an embodiment. As described in FIG. 2A, needle 202 includes the tip 238 on the upper end thereof (e.g., closest to control feature 108). In one embodiment, hex shape tip 238 has a tapped hole with a retaining feature such as shaft threads 204 disposed thereon to couple the needle 202 with the control feature 108. Also depicted are distance 402, distance 404 and distance 406, according to one embodiment. In one embodiment, the three distances are defined between the control feature 108 and the top cap 414 (which is located between the top of the fluid chamber 232 and the control feature 108). In one embodiment, when the control feature 108 is rotationally coupled with needle 202, they move together up and down.

In one embodiment, control feature 108 is rotationally coupled with needle 202 via the tip 238 such that the turning (or rotation) of control feature 108 results in the needle 202 also turning. Moreover, in one embodiment, the rotation of control feature 108 (and thus needle 202), causes control feature 108 and needle 202 to move up or down (e.g., into or out of the cartridge 102) together along the shaft 212.

In one embodiment, when the control feature 108 is turned in a first direction, the control feature 108 and needle 202 will move downward (e.g., into the cartridge 102) together along the shaft 212.

In contrast, when the control feature 108 is turned in a second direction (e.g., a direction opposite the first direction), the control feature 108 and needle 202 will move upward (e.g., away from the cartridge 102) together along the shaft 212. In one embodiment, the upward movement will ultimately cause the needle 202 to move upward which brings the piston 112 up together such that the distance between the shaft 212 and the shim stack 218 is decreased.

In one embodiment, as shown in FIG. 4, the control feature 108 and consequently the needle 202 are positioned at the locked-out compression setting such that the piston 112 is pulled in its most upward location and shaft 212 is applying the maximum pre-load onto the shim stack 218.

In one embodiment, when the control feature 108 and consequently the needle 202 are positioned down such as at distance 406, e.g., the smallest distance between the control feature 108 and the top cap 414, the piston 112 is pushed in its most downward location and shaft 212 is applying the minimum pre-load onto the shim stack 218. In one embodiment, a position of the piston 112 is a default position that occurs when the control feature 108 is at zero degrees rotation (i.e., the control feature 108 has not been manually rotated from a possible rotation position of, for example, 0 to 220 degrees, and remains at 0 degrees, wherein the 220 degrees represents a lockout compression position).

In one embodiment, compression damper 104 requires fewer seals (or O-rings) than known dampers. The torque that a user applies to adjust control feature 108 will translate to the preload force on the shims after overcoming the friction created by 2 O-rings, which is less than would be needed to overcome the friction created by 3 O-rings. This may allow a user to apply less torque when moving control feature 108.

In one embodiment, when the control feature is a remote lever, the compression damper 104 requires at least one seal. When the control feature 108 is the remote lever, this may allow less force to be applied to the remote lever to adjust the damper between each mode.

Thus, in relation to FIGS. 3A-3C, distance 406 corresponds to the compression force setting shown in FIG. 3A, e.g., a low compression force setting. In one embodiment, distance 404 corresponds to the compression force setting shown in FIG. 3B, e.g., a high compression force setting where the distance between the control feature 108 and the top cap 414 has been increased, thereby causing the piston 112 to be moved upward from its most downward location and shaft 212 is applying an increased pre-load onto the shim stack 218. In one embodiment, distance 402 corresponds to the compression force setting shown in FIG. 3C, e.g., a lock-out compression force setting, e.g., where the distance between the control feature 108 and the top cap 414 has been increased to its maximum, thereby causing the piston 112 to be moved as far upward from its most downward location as possible and shaft 212 is applying the maximum pre-load onto the shim stack 218.

Thus, as is depicted in FIGS. 1-4, the compression piston 112 has one circuit (fluid pathway) there through. The opening of this circuit is selectively blocked with a flexible and positionally adjustable shim stack 218. The position (and hence the selective blocking of the circuit) of the shim stack 218 is manipulated with the control feature 108. As described herein, depending on the position of the piston 112 (and thus the relationship between the shim stack 218 and the shaft 212), a desired damping force for a particular compression force of the shock absorber (e.g., a range between the lowest compression force to lockout compression [including high compression force setting]) is accomplished.

The benefits of embodiments of the present technology are numerous. For example, embodiments have an adjustable single fluid circuit that enables multiple damping forces for a range of compression forces. This is, in contrast to conventional technology which requires multiple circuits to enable multiple damping forces for the same range of compression forces. Thus, to accomplish the same damping functions, conventional technology requires a manufacture of more components for a multiple fluid circuit design and thus such manufacturing process is more expensive than the manufacturing of components associated with embodiments of the present technology. Thus, embodiments of the present technology are designed to be of a lower manufacturing cost and to have similar and/or higher performance characteristics as those of conventional technology.

Conventional fork and damper technology provide for a damper placed inside of a fork leg of a fork. The damper includes a rod telescopically positioned with a cartridge. During compression and rebound, the rod moves into and out of the cartridge, respectively. One end of the rod is located in an oil bath of the fork leg (oil that serves to lubricate other moving components existing outside of the compression damper components), while the other end of the rod is located in a fluid filled damper. Conventionally, the oil within the oil bath is of a different type than that oil found within the fluid filled damper. Typically, the rod must pass through a seal before any further portion of it enters the cartridge. This seal is designed to keep any oil from the oil bath that is sticking to the shaft from entering the fluid filled chamber as the shaft passes into the fluid filled chamber. The seal scrapes off the oil from the rod's shaft as the rod's shaft enters the fluid filled chamber. Consequently, this scraping causes a certain amount of friction between the rod's shaft and the seal as the rod's shaft moves into the fluid filled chamber.

Figure 5A:
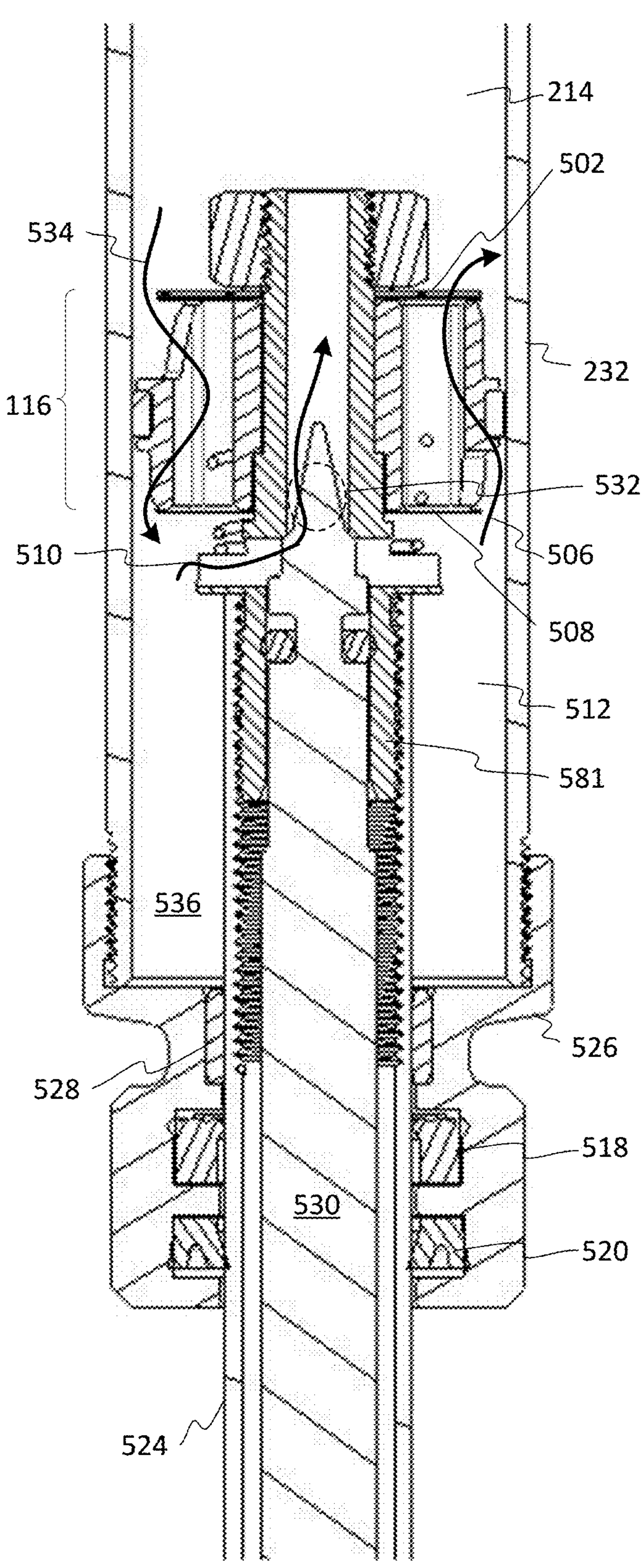
FIG. 5A depicts an enlarged cross-sectional view of a portion of the rod of FIG. 1, in accordance with an embodiment.

FIG. 5A is an enlarged cross-sectional view of a portion of the rod 106, and more particularly the main piston 116 and the sealhead 526 shown in FIG. 1, in accordance with an embodiment. Embodiments of the present technology provide a system for reducing friction between the shaft 524 and a sealhead 526 as the shaft 524 of the rod 106 moves into the fluid filled chamber 114 during compression and rebound. According to embodiments, the monotube damper 100 shown in FIG. 1 is placed within a fork leg of a fork. A portion of the rod 106 is located within an oil bath within the fork leg (fork leg not shown).

FIG. 5A shows the main piston 116, piston stud 581, the shaft 524 and the needle 530 of the rod 106, a sealhead 526 that includes: a bushing 528, a seal 518 (that functions to keep the fluid within the fluid filled chamber 114 from exiting the fluid filled chamber 114), and a seal 520 (that functions to keep the bath oil from the lower leg chamber entering the cartridge 102). In one embodiment, seal 518 and/or seal 520 are U-cup seals.

In one embodiment, sealhead 526 includes a bushing 528, seal 518, and seal 520 to ensure the damper fluid will not leak out into the lower leg, and the bath oil, from the lower leg chamber, will not enter the damper.

A bushing 528 is shown disposed between the shaft 524 of the rod 106 and the sealhead 526 and functions at least to guide the shaft 524 into the fluid filled chamber 114. The main piston 116 is shown positioned between a first side 214 of the compression piston 112 and the chamber 536. The needle 530 is shown to open or close a gap 532 (e.g., a fluid orifice 573 through the piston stud shown in further detail in FIGS. 5C and 5D) which allows the fluid 216 (see FIG. 2A) to flow along pathway 510 from the chamber 536 to the first side 214 of the compression piston 112. Needle 530 controls the flow rate of fluid 216 that flow through gap 532. As the needle 530 goes up and down, it enlarges or reduces the gap between the needle 530 and gap 532 to control the flow rate of fluid 216.

The main piston 116 is shown to include a check valve 508 (also called the "mid-valve") and rebound shims 502 through which fluid flows along pathway 506.

Figure 5B:
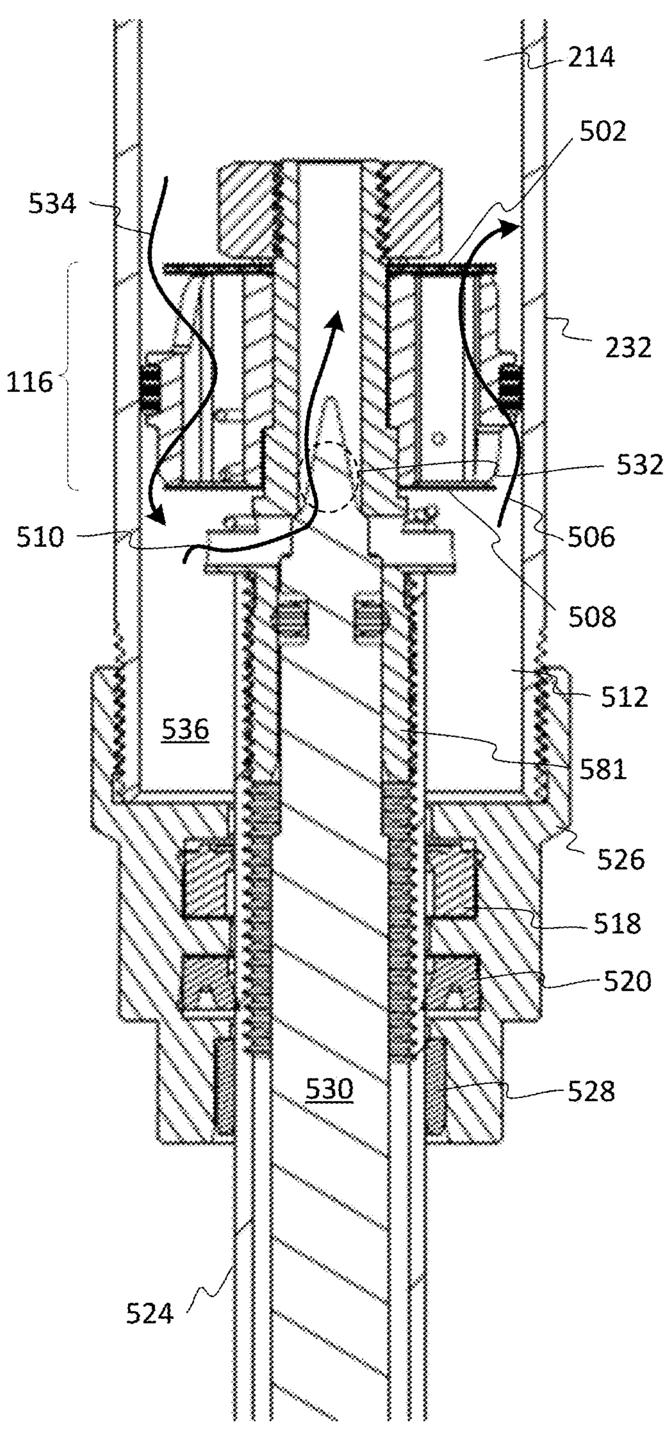
FIG. 5B depicts an enlarged cross-sectional view of a portion of the rod of FIG. 1 with a different sealhead section, in accordance with an embodiment.

FIG. 5B depicts an enlarged cross-sectional view of a portion of the rod of FIG. 1 with a different sealhead section than shown in FIG. 5A, in accordance with an embodiment. In one embodiment, other than the changes to the sealhead section (e.g., the shape of the sealhead 526, the location of seals 518 and 520, and the location of bushing 528), the components of FIG. 5B are similar to those shown and described in FIG. 5A. In one embodiment, although a change to sealhead 526 is shown between FIGS. 5A and 5B, this is a weight savings feature. Thus, other geometric, non-geometric, or other shapes, holes, cutouts, or the like may be made to the sealhead 526 and or the order of the components within the sealhead section to provide different levels of weight savings, manufacturing simplification, etc. Thus, the shape of sealhead 526 in FIGS. 5A and 5B are examples of different embodiments to show that other shapes and/or modifications may be made to sealhead 526 in another embodiment.

Figure 5C:
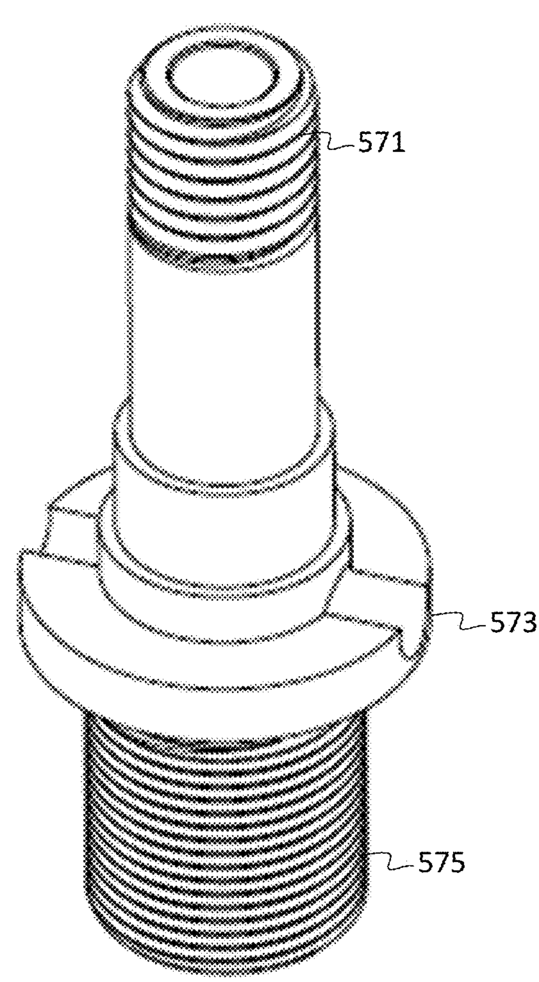
FIG. 5C is a perspective view of the piston stud of FIGS. 5A and 5B, in accordance with one embodiment.

FIG. 5C is a perspective view of piston stud 581 in accordance with one embodiment. Shown in FIG. 5C are threads 571, fluid orifice 573, and threads 575.

Figure 5D:
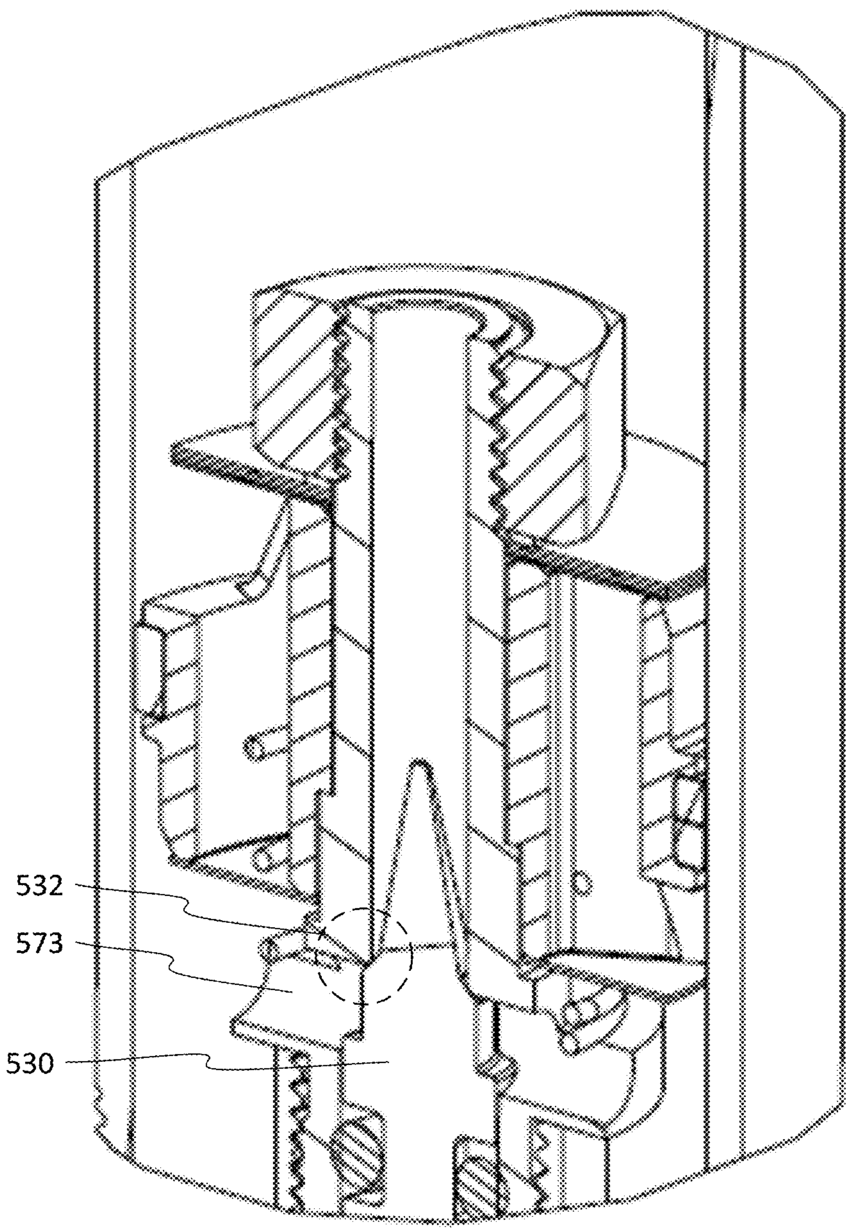
FIG. 5D is an enlarged view of a portion of FIGS. 5A and 5B in accordance with an embodiment.

FIG. 5D is an enlarged view of a portion of FIGS. 5A and 5B in accordance with an embodiment. In FIG. 5D, the enlarged view shows the fluid orifice 573, and the gap 532 that is opened and closed by needle 530. In one embodiment, fluid orifice 573 is T-shaped.

With reference now to FIGS. 1, 2A and 5A-5D and according to an embodiment, the following fluid flow is described in conjunction with the functioning of embodiments of novel components described herein.

In one embodiment, as the fork leg, including the monotube damper 100, vibrates and shakes during a vehicle's operation, the fluid in the oil bath of the lower leg may move around and temporarily adhere to the shaft 524 of the rod 106. In response to an event causing compression of the shock absorber, the shaft 524 of the rod 106 moves into a portion 512 of the fluid filled chamber 114. In one embodiment, the oil from the oil bath adhered to the shaft 524 is scrapped off by seal 520. In one embodiment, the oil is scrapped off by seal 520 and by bushing 528. In response to an event causing a rebound of the shock absorber, the shaft 524 of the rod 106 moves out of the fluid filled chamber 114, and the fluid 216 that was temporarily adhering to the shaft 524 is scraped off by seal 518 and remains within the portion 512 of the fluid filled chamber 114. In one embodiment, the fluid 216 is scrapped off by seal 518 and by bushing 528. As the main piston 116 moves downward and in a direction away from the control feature 108, a first portion of the fluid 216 within the portion 512 of the fluid filled chamber 114 moves through the gap 532 within the needle 530 and along the pathway 510 into the first side 214 of the fluid filled chamber 114. Another portion of the fluid 216 within the fluid filled chamber 114 moves along pathway 506, pushes open the rebound shims 502 and moves through the resulting gap 504 into the first side 214 of the fluid filled chamber 114. Thus, a portion of the fluid 216 that was in the portion 512 of the fluid filled chamber 114 is now in the first side 214 of the fluid filled chamber 114.

In one embodiment, the sealhead 526 has two seals. In one embodiment, the disclosed device for controlling fluid flow does not have leak paths to bleed the bath oil (from the lower leg) out of the fluid chamber. Without proper sealing, the bath oil keeps accumulating in the fluid chamber, this eventually may damage the damper. In one embodiment, the two seals of the sealhead 526 effectively keep the bath oil out of the fluid chamber and keep the fluid from the fluid chamber out of the lower leg.

In one embodiment, the bushing is located below the seal to allow for better scraping of the bath oil from the shaft. In one embodiment, the cut-outs provide additional weight savings and the lower portion of the sealhead 526 is ergonomically shaped to allow for easier assembling of the sealhead 526 with the cartridge.

In one embodiment, the reduction of the number of parts (e.g., the removal of a dowel pin or a pre-load hat from the piston, the optional removal of the IFP, the reduced number of parts and seals) allows for achieving a lighter damper assembly and reducing assembly time during the manufacturing process. Moreover, by having fewer parts there are fewer potential failure points, fewer opportunities for component degradation that would contaminate and/or jam the fluid path or obstruct some other operation of the shock assembly.

Although discussed in an embodiment of main piston, the fluid flow controlling device described herein may be used in other aspects such as base pistons, ancillary flow paths, and/or other components and hydraulic applications such as front shock assemblies and the like.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A shock assembly comprising:

a damper comprising:

a single adjustable fluid circuit configured for controlling a damping force associated with multiple compression forces of said shock absorber, wherein said single adjustable fluid circuit comprises:

a fluid passageway through a base valve; and a positionally adjustable piston assembly comprising a floating shim stack, said positionally adjustable piston assembly configured for selectively blocking a flow of a fluid through said fluid passageway; wherein a compression event causes said fluid to apply a compression force on said positionally adjustable piston assembly, said compression force causing said positionally adjustable piston assembly to move in a compression direction.

2. The shock assembly of claim 1, wherein said positionally adjustable piston assembly is positioned at one end of said fluid passageway.

3. The shock assembly of claim 1, further comprising:

a compression force adjuster to modify a compression force setting of said damper;

a needle coupled between said compression force adjuster and said positionally adjustable piston assembly; and a shaft coupled with said needle.

4. The shock assembly of claim 3, wherein said shaft is threadedly coupled with said needle.

5. The shock assembly of claim 3, wherein a position of said positionally adjustable piston assembly is adjustable relative to said shaft.

6. The shock assembly of claim 3, wherein said positionally adjustable piston assembly is configured to move longitudinally with said needle.

7. The shock assembly of claim 1, further comprising:

said positionally adjustable piston assembly coupled with a needle; and said compression force configured to move said positionally adjustable piston assembly coupled with said needle toward a shaft.

8. The shock assembly of claim 1, wherein said positionally adjustable piston assembly is configured to apply an additional preload force to at least one shim of said floating shim stack when said positionally adjustable piston assembly is in contact with said at least one shim.

* * * * *